(12) United States Patent
Yamamoto

(10) Patent No.: US 6,866,351 B2
(45) Date of Patent: Mar. 15, 2005

(54) ROTARY BUSHING TYPE CRAWLER TRACK

(75) Inventor: Teiji Yamamoto, Kadoma (JP)

(73) Assignee: Komatsu, Ltd. (JP)

( * ) Notice: Subject to any disclaimer, the term of this patent is extended or adjusted under 35 U.S.C. 154(b) by 0 days.

(21) Appl. No.: 10/349,034

(22) Filed: Jan. 23, 2003

(65) Prior Publication Data

US 2003/0141760 A1 Jul. 31, 2003

(30) Foreign Application Priority Data

Jan. 31, 2002 (JP) ........................................ 2002-022803

(51) Int. Cl.$^7$ .......................................... B62D 55/205
(52) U.S. Cl. ........................ 305/185; 305/193; 305/196; 305/202
(58) Field of Search ............................... 305/185, 188, 305/193, 194, 195, 196, 198, 200, 201, 202, 204

(56) References Cited

U.S. PATENT DOCUMENTS

| | | | | |
|---|---|---|---|---|
| 3,567,294 A | * | 3/1971 | Simpson et al. | 305/201 |
| 4,035,036 A | * | 7/1977 | Boggs et al. | 305/197 |
| 4,083,611 A | * | 4/1978 | Schaffner et al. | 305/186 |
| 4,159,857 A | * | 7/1979 | Purcell | 305/187 |
| 4,306,753 A | * | 12/1981 | Livesay et al. | 305/201 |
| 4,428,625 A | * | 1/1984 | Wohlford | 305/108 |
| 4,449,758 A | * | 5/1984 | Wohlford et al. | 305/108 |
| 6,206,491 B1 | * | 3/2001 | Hisamatsu | 305/103 |
| 6,220,378 B1 | * | 4/2001 | Oertley et al. | 180/9.62 |
| 6,322,173 B1 | * | 11/2001 | Maguire et al. | 305/185 |

FOREIGN PATENT DOCUMENTS

| | | |
|---|---|---|
| JP | 50-100238 | 8/1975 |
| JP | 6-504747 | 6/1994 |
| JP | 10-167131 | 6/1998 |
| WO | WO 93/11020 | 6/1993 |

* cited by examiner

*Primary Examiner*—Russell D. Stormer
(74) *Attorney, Agent, or Firm*—Rader, Fishman & Grauer, PLLC; Ronald P. Kananen

(57) ABSTRACT

A crawler track is provided which is improved in the service life of bushings engaging a driving wheel (sprocket) of a track type vehicle, thereby reducing the running cost and which can be used under high loading conditions and therefore has a wide range of applications covering all types of machines from small-sized to large-sized work machines. In the crawler track of the track type vehicle having a track chain composed of a plurality of track links each having a pair of links spaced apart from each other in a lateral direction and a pin for coupling the pair of links, the track links being connected in the form of a loop by their pins, each bushing engaging the driving wheel (sprocket) is rotatably mounted to its associated pin and a beam for coupling the pair of links is disposed at the center of the space between every adjacent pins.

2 Claims, 6 Drawing Sheets (a)

(b)

(a)

(b)

(c)

ROTARY BUSHING TYPE CRAWLER TRACK

TECHNICAL FIELD

The present invention relates to a crawler track for use in track type vehicles and more particularly to a rotary bushing type crawler track in which bushings engaging a driving wheel of a track type vehicle are rotatable.

BACKGROUND ART

Referring to FIG. 6(a), it can be seen that a known crawler track 50 mounted on a bulldozer (not shown) that is a kind of track type vehicle comprises a track chain 51 wound around an idler (not shown) that is a coupled driving wheel and around a sprocket (not shown) that is a driving wheel; and track shoes 52 attached to the track chain 51. The track chain 51 is composed of a plurality of track links 53 which are connected in the form of a loop, each track link 53 comprising a pair of links 61 spaced apart from each other in a widthwise (lateral) direction of the crawler track; a pin 63 for coupling the pair of links 61 at their first ends 62; and a track bushing 65 for coupling the pair of links 61 at their second ends 64. In each track link 53, the pin 63 (hereinafter referred to as "coupling pin 63") and the track bushing 65 are inserted in a press fit condition into the first ends 62 and second ends 64, respectively, of the pair of links 61. The adjacent track links 53 are coupled to each other so as to be flexible about the coupling pin 63 and the track bushing 65. In the crawler track 50, the track bushing 65 positioned at the coupling part of each track link 53 is designed to come into engagement with the tooth of the sprocket so that the motive power of the sprocket is transmitted to the coupling pin 63, the pair of links 61 and the track shoes 52.

In the crawler track 50, since the track bushing 65 functions not only as a bearing member for supporting a rotating kinematic pair in the track chain 51 but also as a power transmitting element for directly transmitting motive power from the sprocket, the outer peripheral surface of the track bushing 65 is subjected to a surface pressure caused by the sliding contact between the outer peripheral surface and the tooth face of the sprocket and a relative slip occurring at the time when the track bushing 65 comes into engagement with the sprocket. However, both ends of the track bushing 65 are secured to the pair of links 61, so that the outer peripheral surface of the track bushing 65 is locally subjected to the surface pressure and the relative slip. Therefore, the track bushing 65 of the conventional crawler track 50 is rapidly worn out, resulting in increased running cost.

As an attempt to solve such a problem, a crawler track is disclosed in Published Japanese Translation of PCT International Publication for Patent Application No. 6-504747. The crawler track according to this prior art is designed such that the track bushing 65 of the above-described crawler track 50 is divided into three parts and the middle one which is positioned between the parts engaging the tooth of the sprocket is made to be rotatable. This enables a smooth engagement between the track bushing and the tooth of the sprocket and alleviates the relative slip occurring at the time of the engagement, thereby preventing the premature wear of the bushing engaging the sprocket.

While each track link 53 of the crawler track 50 is arranged such that as shown in FIG. 6(b), the pair of links 61, the track bushing 65 and the coupling pin 63 constitute a rigidly joined, rectangular framed construction, each track link of the crawler track disclosed in Published Japanese Translation of PCT International Publication for Patent Application No. 6-504747 has a construction in which the track bushing corresponding to the track bushing 65 is split into three parts. Therefore, the track link of the above publication has a framed construction in the form of the right side of square brackets (]) in which only the pair of links 61 and the coupling pin 63 are rigidly joined as shown in FIG. 6(c), so that the rigidity of the track link of the publication is considerably poor compared to the track link 53. The crawler track disclosed in the above publication therefore presents the problem that it is applicable only to small-sized work machines which are used under low loading conditions such as flat lands and sandy areas.

The present invention is directed to overcoming the foregoing problems and a primary object of the invention is therefore to provide a rotary bushing type crawler track which is improved in the service life of the bushings engaging the driving wheel (sprocket) of the track type vehicle, thereby reducing the running cost and which can be used under high loading conditions and therefore has a wide range of applications covering all types of work machines from small-sized to large-sized work machines.

DISCLOSURE OF THE INVENTION

The above object can be accomplished by a rotary bushing type crawler track according to the invention, wherein bushings coming into engagement with a driving wheel of a track type vehicle are disposed so as to be rotatable, which comprises a track chain and track shoes attached to the track chain, the track chain being composed of a plurality of track links each having a pair of links spaced apart from each other in a lateral direction and a pin for coupling the pair of links, the track links being connected in the form of a loop by their pins, wherein each bushing is rotatably mounted to its associated pin, and a beam is provided between every adjacent pins, for coupling the pair of links.

In the present invention, the bushings (rotary bushings) engaging the driving wheel (sprocket) of the track type vehicle are rotatably disposed, thereby significantly restricting wear caused by a sliding contact occurring between the bushing and the driving wheel when the bushing engages and disengages the driving wheel and thereby alleviating a relative slip occurring when the bushing comes into engagement with the driving wheel. In addition, since a pair of links are coupled to each other by the beam and pin, each track link constituting the track chain has a rectangular framed construction, so that the track link has high rigidity, resulting in a durable crawler track. Accordingly, the invention provides a crawler track in which the service life of the bushings engaging the driving wheel of the track type vehicle can be improved, thereby reducing the running cost, and which is usable under high loading conditions such as unleveled lands and rocky areas and has a wide range of applications covering all types of work machines from small-sized to large-sized work machines.

In the invention, each beam is preferably press fit in its associated pair of links. With this arrangement, the beam is steadily joined to the pair of links so that the rigidity of the track link can be increased and disassembly of the track links becomes possible.

Preferably, the paired links are respectively made to be thicker in a lateral direction at their central portions than at their longitudinal ends. A laterally inside part of the central portion of each link is provided with a beam fitting hole in which the beam is press fit, whereas a laterally outside part of the central portion of each link is provided with a bolt insertion hole into which a bolt for securing the track shoe to the track chain is inserted. With this arrangement, a fitting hole deep enough to rigidly join the beam to the pair of links can be obtained.

BRIEF EXPLANATION OF THE DRAWINGS

FIG. 1 is an explanatory structural view of a rotary bushing type crawler track according to one embodiment of the invention, wherein FIG. 1(a) is a sectional plan view of an essential part and FIG. 1(b) is a side view.

BEST MODE FOR CARRYING OUT THE INVENTION

Referring now to the accompanying embodiment, a rotary bushing type crawler track will be concretely explained according to a preferred embodiment of the invention.

Figure 1:
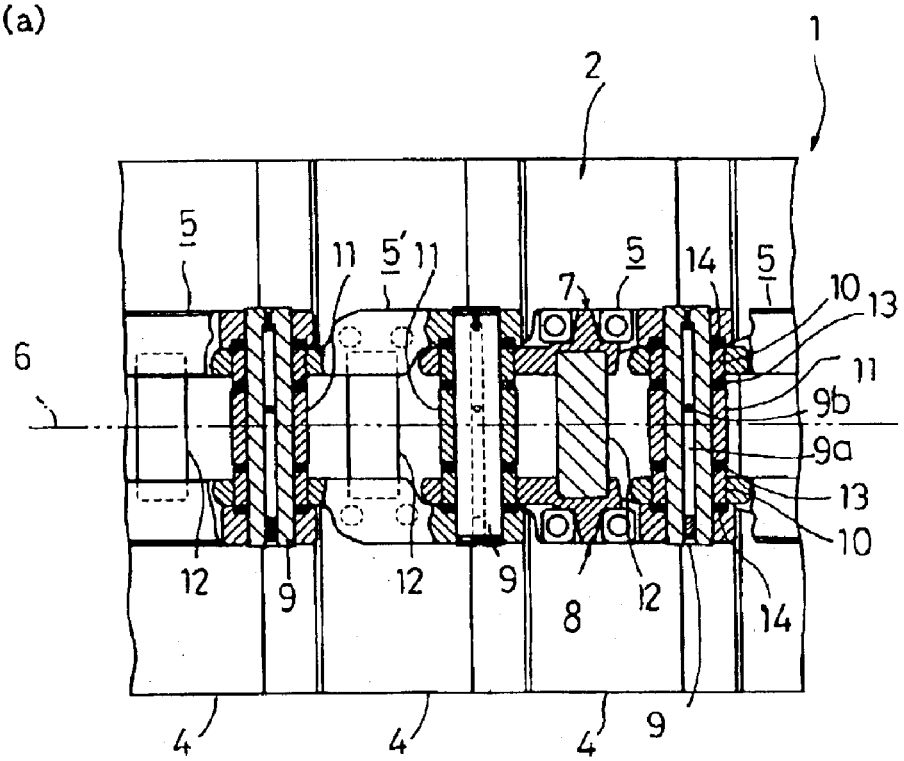
Figure 1:
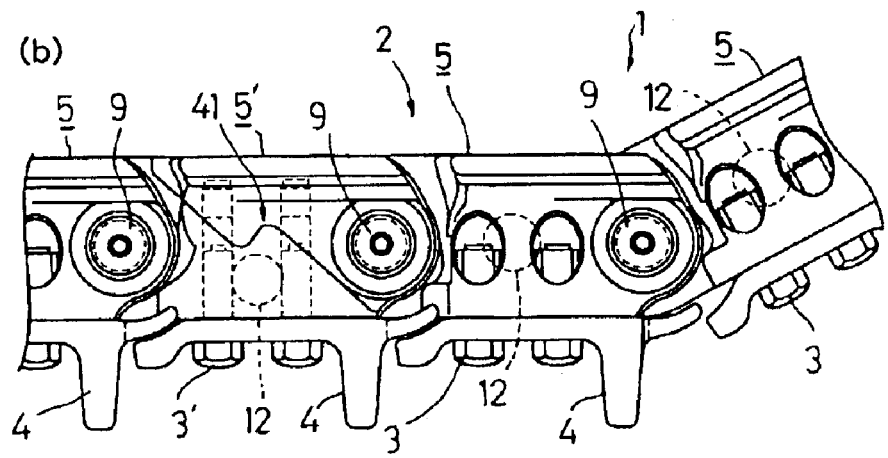
Figure 2:
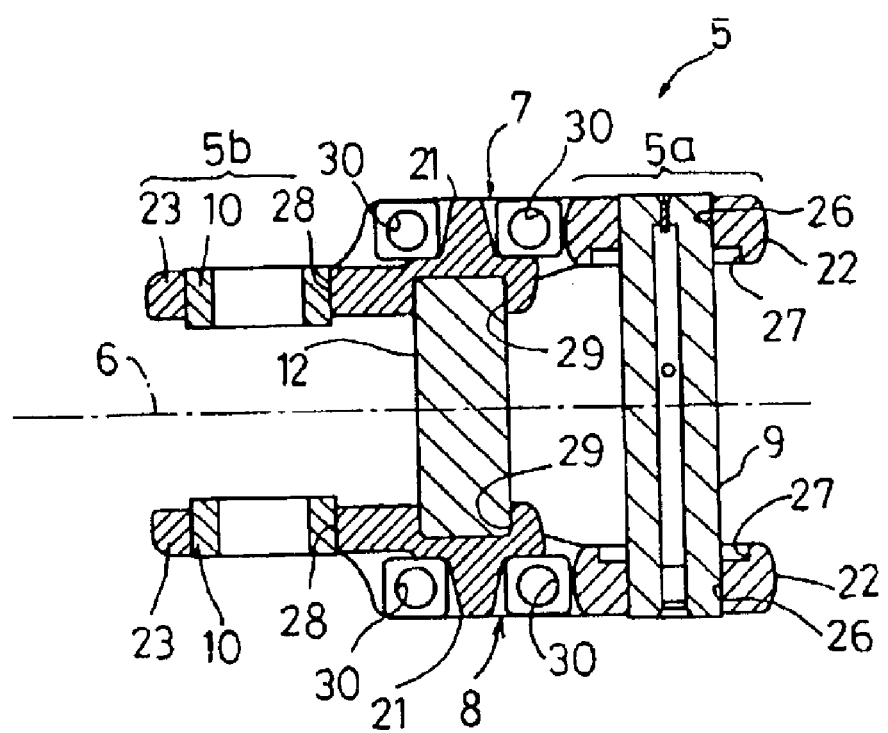
FIG. 2 is an explanatory structural view of a track link according to the embodiment of the invention.
Figure 3:
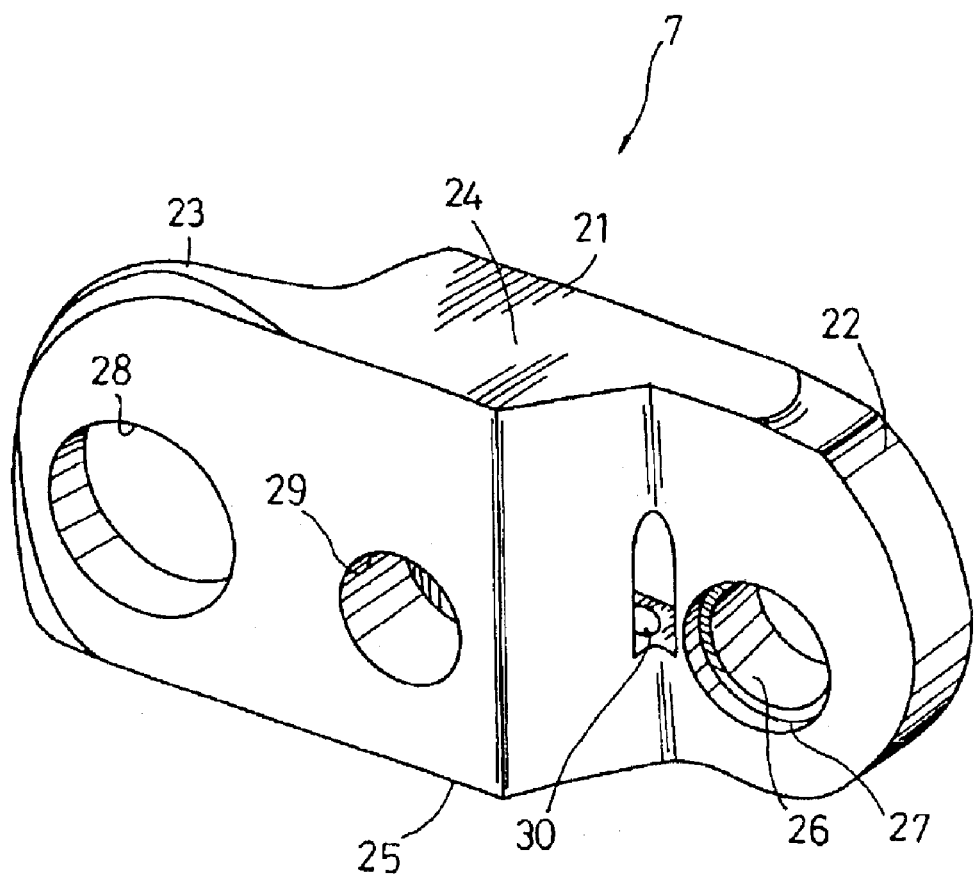
FIG. 3 is an entire perspective view of a right link constituting the track link.

FIG. 1 is an explanatory structural view of a rotary bushing type crawler track according to one embodiment of the invention, wherein FIG. 1(a) is a sectional plan view of an essential part and FIG. 1(b) is a side view. FIG. 2 is an explanatory structural view of a track link according to the present embodiment. FIG. 3 is an entire perspective view of a right link constituting the track link.

The present embodiment is associated with one application in which the invention is applied to a bulldozer (not shown) that is a kind of track type vehicle. The bulldozer according to the present embodiment comprises a vehicle body (not shown); and rotary bushing type crawler tracks 1 disposed at both sides of the vehicle body, for forwardly and backwardly moving and turning the vehicle body.

Each rotary bushing type crawler track 1 comprises a track chain 2 wound around an idler (not shown) that is a coupled driving wheel of the undercarriage and around a sprocket (not shown) that is a driving wheel; and track shoes 4 attached to the track chain 2 by bolts 3. The rotating operation of the sprocket causes the crawler track 1 to rotate around a path defined by the idler and the sprocket, so that the vehicle body moves or turns.

The track chain 2 is made up of a plurality of track links 5 which are linked in the form of a loop. One end (a first longitudinal end) of each track link 5 when viewing in the longitudinal direction of the vehicle body is an outer link portion 5a which overlaps the outside of a second longitudinal end of an adjacent track link 5. The other end (a second longitudinal end) of the track link 5 when viewing in the longitudinal direction of the vehicle body is an inner link portion 5b which overlaps the inside of the first longitudinal end (the outer link portion 5a of another adjacent track link 5).

Each track link 5 includes a pair of links 7, 8 opposed to each other with a center line 6 of the track chain 2 (hereinafter referred to as "longitudinal center line 6") between, the center line 6 extending in a longitudinal direction of the vehicle body. Specifically, the right link 7 is positioned at the right hand with respect to the longitudinal center line 6 whereas the left link 8 is positioned at the left hand with respect to the longitudinal center line 6, being spaced a specified distance away from the right link 7. The track link 5 further includes a pin 9 (hereinafter referred to as "coupling pin 9") for coupling one end 22 of the right link 7 to one end 22 of the left link 8 and coupling the track link 5 to an adjacent track link 5 located on the side of the first longitudinal end of the track link 5; and track bushings 10 disposed at the second longitudinal end of the track link 5 for serving as a bearing member for the coupling pin 9 of another adjacent track link 5 located on the side of the second longitudinal end of the track link 5. It should be noted that the right link 7 and the left link 8 are symmetrical with respect to a vertical plane including the longitudinal center line 6, and therefore identical parts of the right and left links 7, 8 are indicated with the same reference numerals in the drawings.

Now, there will be described the structure of the right and left links 7, 8. As mentioned earlier, since the right and left links 7, 8 are symmetrical with respect to a vertical plane including the longitudinal center line 6, the description of the structure of the right link 7 is common to the left link 8. Therefore, only the structure of the right link 7 will be hereinafter explained in detail.

As seen from FIGS. 2, 3, the right link 7 is composed of a plate-like member which is deverted along the way and then extends in a longitudinal direction, and has a thick central portion 21 at the diverted point. A first end 22 of the link 7 is offset laterally outwardly from a second end 23. In FIG. 3, the right link 7 has, at its upper surface, a rail face 24 with which the idler, carrier roller and track roller (which are not shown) come into rolling contact. Opposite to the rail face 24 is a mounting face 25 for the track shoe 4. The first end 22 of the right link 7 is provided with a pin insertion hole 26 into which the coupling pin 9 is inserted. A stepped hole 27 concentric with the pin insertion hole 26 is defined so as to be opposed to the inner link portion 5b of the adjacent track link 5. The second end 23 of the right link 7 is provided with a bushing insertion hole 28 into which the track bushing 10 is inserted.

In the track link 5 of the present embodiment, the coupling pin 9 is fitted by insertion fit in the respective pin insertion holes 26 of the right and left links 7, 8. By press fitting the coupling pin 9 in the pin insertion holes 26, the right link 7, the coupling pin 9 and the left link 8 are rigidly joined. The track bushings 10 are also fitted by an interference fit in the respective bushing insertion holes 28 of the right and left links 7, 8. By press fitting the track bushings 10 in the bushing insertion holes 28, the track bushings 10 are rigidly joined to the second ends 23 of the right and left links 7, 8.

Figure 4:
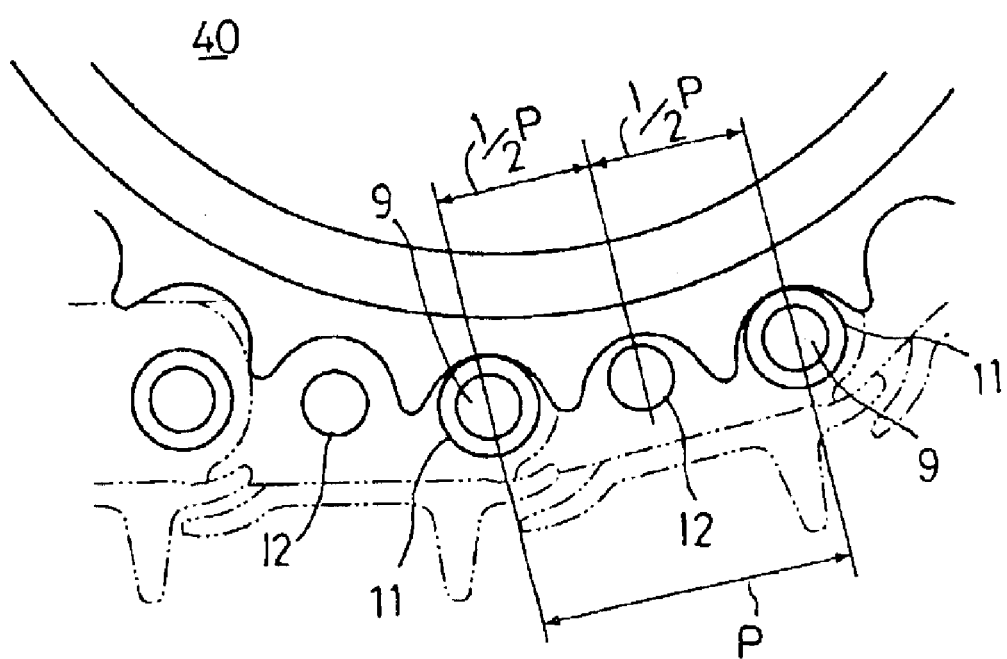
FIG. 4 is a diagram showing an engagement state of the rotary bushing type crawler track and a sprocket according to the embodiment of the invention.

As shown in FIG. 1, in the track chain 2 of the present embodiment, the adjacent track links 5 are flexibly coupled to each other by the coupling pin 9 and the track bushings 10, and a rotary bushing 11, which is comprised of a cylindrical bushing and comes into engagement with the tooth of the sprocket, is mounted to each coupling pin 9 so as to be rotatable about the coupling pin 9. As shown in FIG. 4, the rotary bushing 11 positioned at the coupling section of each track link 5 is engaged with every other tooth of the sprocket 40 so that the power of the sprocket is transmitted through the rotary bushings 11 to the coupling pins 9, the right links 7, the left links 8 and then to the track shoes 4.

As shown in FIG. 1, in the present embodiment, the coupling pin 9 has, in the inside thereof, an oil reservoir 9a for storing a lubricant and an oil path 9b for guiding the lubricant from the oil reservoir 9a to the outer peripheral face of the coupling pin 9. The lubricant stored in the oil reservoir 9a is supplied to the contact face between each coupling pin 9 and each track bushing 10 and to the contact face between each coupling pin 9 and its associated rotary bushing 11 by way of the oil path 9b, so that these contact faces are lubricated with the oil. A sealing device 13 is inserted between the rotary bushing 11 and the track bushing 10 and each stepped hole 27 is provided with a sealing device 14, for preventing foreign matter from getting into the contact faces and preventing leakage of the sealed lubricant. Thus, the wear resistance of the rotary bushings 11 and the track bushings 10 is improved.

In the present embodiment, each track link 5 has a beam 12 which is disposed halfway between the coupling pins 9 of the adjacent track links, for coupling the right link 7 and the left link 8 to each other. Specifically, each beam 12 is a laterally extending cylindrical member with its axial center positioned in a plane including the axial center of the adjacent coupling pin 9, and the distance between the axial center of the beam 12 and the axial center of the coupling pin 9 is equal to one half the distance between the axial centers of the adjacent coupling pins 9 (See FIG. 4). As shown in FIG. 2, the right and left links 7, 8 are respectively provided with a beam fitting hole 29 in which an end of the beam 12 is fitted. The ends of the beam 12 are fitted by an interference fit in the beam fitting holes 29. By press fitting the beam 12 in the beam fitting holes 29, the right link 7, the beam 12 and the left link 8 are rigidly joined. One reason for the provision of the beam 12 positioned halfway between the adjacent coupling pins 9 is achievement of rigidity and another reason is that since the coupling pin 9 is engaged with every other tooth of the sprocket 40 through the rotary bushing 11, as shown in FIG. 4, the interference between the beam 12 and the tooth of the sprocket 40 at the time of the engagement of the sprocket 40 can be prevented by positioning the beam 12 halfway between the adjacent coupling pins 9.

Figure 6:
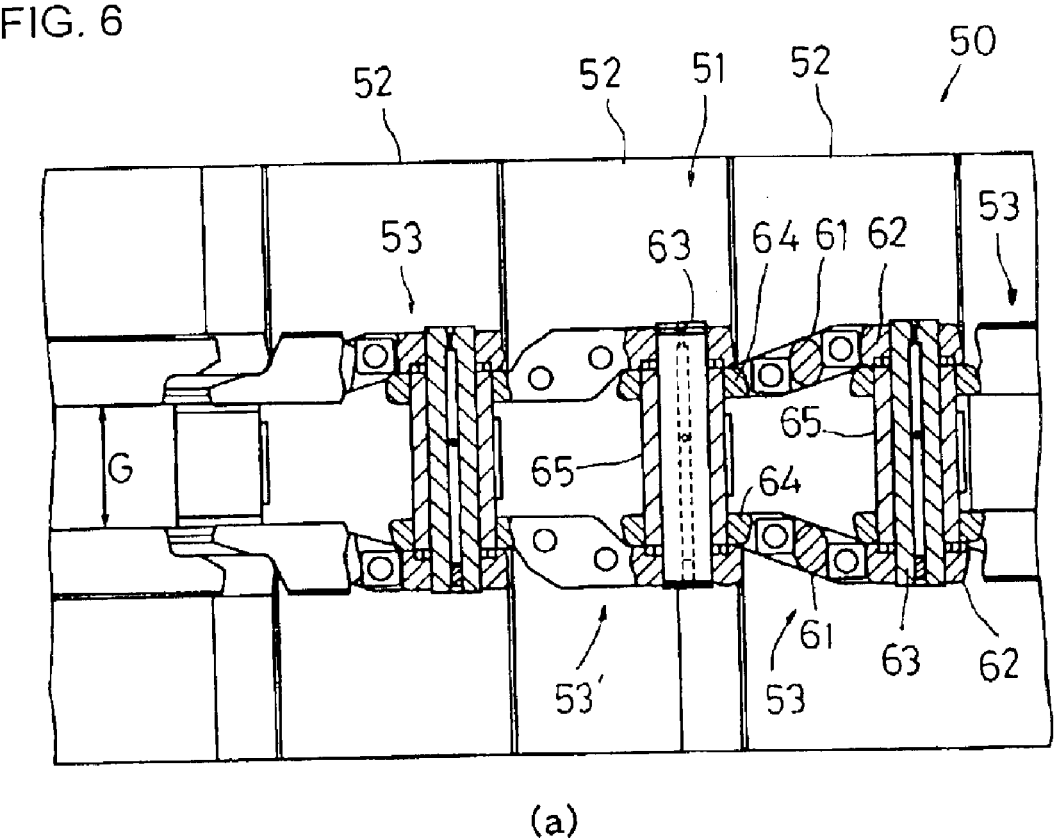
FIGS. 6(a) to 6(c) are explanatory structural views of a crawler track according to the prior art.
Figure 6:
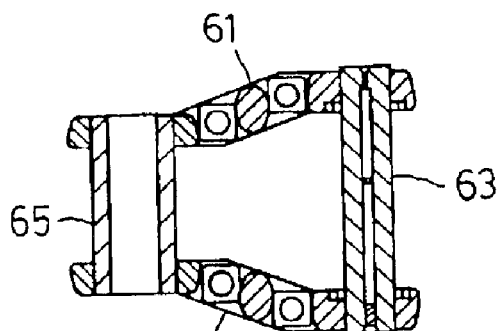
Figure 6:
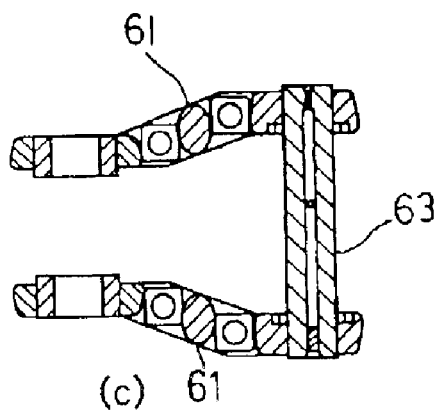

In the present embodiment, in order to respectively provide the right and left links 7, 8 with the beam fitting hole 29 having an enough insertion depth to ensure rigid joint of the beam 12, the respective central parts 21 of the right and left links 7, 8 are laterally thickened compared to the central parts of the conventional links 61, within the limits of compatibility with other components such as the idler, carrier roller and track roller based on the rail gauge (i.e., the gauge indicated by code G in FIG. 6(a)) of the conventional crawler track 50. Further, a bolt insertion hole 30, into which the bolt 3 for securing the track shoe 4 is inserted, is positioned laterally outside of the respective thickened central parts 21 of the right and left links 7, 8. With the above arrangements, the desired beam fitting holes 29 can be obtained which have compatibility with other components based on the rail gauge of the conventional crawler tracks 50.

Since the crawler track 1 of the present embodiment having the above-described configuration is provided with the rotatably disposed rotary bushings 11 which come into engagement with the tooth of the sprocket 40, wear caused by sliding contact when the rotary bushing 11 engages or disengages the tooth of the sprocket 40 can be restricted to a considerable extent and a relative slip occurring at the time of the engagement with the sprocket 40 can be alleviated. In addition, since each track link 5 has a rectangular framed construction constituted by the right link 7, the left link 8, the coupling pin 9 and the beam 12 which are rigidly joined, not only the loss of rigidity due to the provision of the rotary bushing 11 can be compensated but also the track link 5 having high rigidity can be obtained so that the durable crawler track 1 can be accomplished. Accordingly, in the present embodiment, the service life of the bushings coming into engagement with the sprocket can be improved, thereby reducing the running cost, and at the same time, it is possible to attain a crawler track which can be used under high loading conditions such as unleveled lands and rocky areas and therefore has a wide range of applications covering all types of work machines from small-sized to large-sized work machines.

Figure 5:
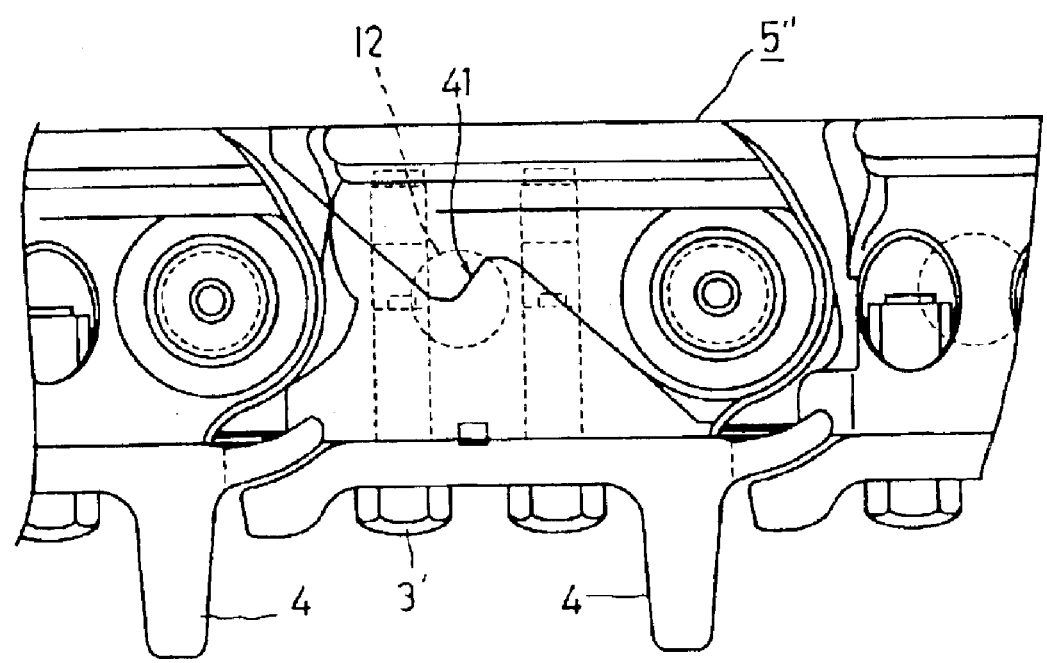
FIG. 5 is a view showing an example of the arrangement of a beam in a master link.

In the present embodiment, one or two special track links 5' generally called "master link" are provided for the track chain 2 for the purpose of comparatively easy replacement of the crawler track 1 (see FIGS. 1(a), 1(b)). This track link 5' can be split into two with a split face 41 serving as the boundary, by removing a bolt 3'. Of the two parts of the track link 5', the one having an attachment face 25 for the track shoe 4 is provided with the beam 12 in accordance with the above-described purpose in view of easy manufacture and assembly. It is also possible to arrange the beam 12 alongside the boundary (split face 41) of a track link 5" as shown in FIG. 5.

What is claimed is:

1. A rotary bushing type crawler track, wherein bushings coming into engagement with a driving wheel of a track type vehicle are disposed so as to be rotatable, which comprises a track chain and track shoes mounted to the track chain, the track chain being composed of a plurality of track links each having a pair of links spaced apart from each other in a lateral direction and a pin for coupling the pair of links, the track links being connected in the form of a loon by their pins, wherein each bushing is rotatably mounted to its associated pin, and a beam is provided between every adjacent pin, for coupling the pair of links, wherein said beam is press fit in its associated pair of links, and wherein the bushings coming into engagement with the driving wheel are engaged with every other tooth of a sprocket while the beam travels within another tooth of said sprocket adjacent said every other tooth while not engaging the sprocket.

2. A rotary bushing type crawler track, wherein bushings coming into engagement with a driving wheel of a track type vehicle are disposed so as to be rotatable, which comprises a track chain and track shoes mounted to the track chain, the track chain being composed of a plurality of track links each having a pair of links spaced apart from each other in a lateral direction and a pin for coupling the pair of links, the track links being connected in the form of a loop by their pins, wherein each bushing is rotatably mounted to its associated pin, and a beam is provided between adjacent pins, for coupling the pair of links, wherein the bushings coming into engagement with the driving wheel are engaged with every other tooth of a sprocket while the beam travels within another tooth of said sprocket adjacent said every other tooth while not engaging the sprocket.

* * * * *